United States Patent
Francis

(10) Patent No.: US 11,474,845 B2
(45) Date of Patent: Oct. 18, 2022

(54) SYSTEM AND METHOD FOR VERSIONED SCRIPT MANAGEMENT

(71) Applicant: ServiceNow, Inc., Santa Clara, CA (US)

(72) Inventor: Steven Wade Francis, La Jolla, CA (US)

(73) Assignee: ServiceNow, Inc., Santa Clara, CA (US)

( * ) Notice: Subject to any disclaimer, the term of this patent is extended or adjusted under 35 U.S.C. 154(b) by 114 days.

(21) Appl. No.: 17/015,844

(22) Filed: Sep. 9, 2020

(65) Prior Publication Data

US 2022/0075636 A1    Mar. 10, 2022

(51) Int. Cl.
| | | |
|---|---|---|
| *G06F 9/44* | (2018.01) | |
| *G06F 9/455* | (2018.01) | |
| *G06F 8/71* | (2018.01) | |
| *G06F 8/60* | (2018.01) | |
| *G06F 8/70* | (2018.01) | |
| *G06F 9/445* | (2018.01) | |

(52) U.S. Cl.
CPC ............ *G06F 9/45512* (2013.01); *G06F 8/60* (2013.01); *G06F 8/70* (2013.01); *G06F 8/71* (2013.01); *G06F 9/44536* (2013.01)

(58) Field of Classification Search
None
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,678,887 B1 | 1/2004 | Hallman |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warbenburg |

(Continued)

OTHER PUBLICATIONS

Ukessays.Com, "Advantages of Scripting Language Computer Science Essay", Jan. 2015 (Year: 2015).*

*Primary Examiner* — Wei Y Zhen
*Assistant Examiner* — Lanny N Ung
(74) *Attorney, Agent, or Firm* — Fletcher Yoder PC

(57) ABSTRACT

This disclosure is directed to a versioned script management (VSM) system that enables a client instance to implement versioned script management. A versioned scripts table includes one or more fields storing version information for each script. The version information tracks platform release information (e.g., family, patch, and/or hotfix release version information) of each script, while also tracking client-specific versions of these scripts that have been modified after release. The VSM system includes instructions to create a modified version of an existing script and to perform a platform release update of platform scripts without overwriting or changing the behavior of client-modified versions of these scripts. As such, the VSM system enables script modifications, as part of client customization and/or platform updates, while avoiding the possibility of introducing regressions as a result of these modifications.

20 Claims, 10 Drawing Sheets

(56) References Cited

U.S. PATENT DOCUMENTS

| | | | |
|---|---|---|---|
| 7,131,037 B1 | 10/2006 | LeFaive | |
| 7,170,864 B2 | 1/2007 | Matharu | |
| 7,350,209 B2 | 3/2008 | Shum | |
| 7,392,300 B2 | 6/2008 | Anantharangachar | |
| 7,610,512 B2 | 10/2009 | Gerber | |
| 7,617,073 B2 | 11/2009 | Trinon | |
| 7,685,167 B2 | 3/2010 | Mueller | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidari | |
| 7,930,396 B2 | 4/2011 | Trinon | |
| 7,933,927 B2 | 4/2011 | Dee | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,151,261 B2 | 4/2012 | Sirota | |
| 8,224,683 B2 | 7/2012 | Manos | |
| 8,266,096 B2 | 9/2012 | Navarrete | |
| 8,380,645 B2 | 2/2013 | Kowalski | |
| 8,402,127 B2 | 3/2013 | Solin | |
| 8,457,928 B2 | 6/2013 | Dang | |
| 8,478,569 B2 | 7/2013 | Scarpelli | |
| 8,554,750 B2 | 10/2013 | Rangaranjan | |
| 8,612,408 B2 | 12/2013 | Trinon | |
| 8,646,093 B2 | 2/2014 | Myers | |
| 8,674,992 B2 | 3/2014 | Poston | |
| 8,689,181 B2 * | 4/2014 | Biron, III | H04L 41/22 717/115 |
| 8,689,241 B2 | 4/2014 | Naik | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 8,887,133 B2 | 11/2014 | Behnia | |
| 8,983,982 B2 | 3/2015 | Rangarajan | |
| 9,015,188 B2 | 4/2015 | Behne | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,239,857 B2 | 1/2016 | Trinon | |
| 9,317,327 B2 | 4/2016 | Apte | |
| 9,323,801 B2 | 4/2016 | Morozov | |
| 9,363,252 B2 | 6/2016 | Mueller | |
| 9,412,084 B2 | 9/2016 | Kowalski | |
| 9,467,344 B2 | 10/2016 | Gere | |
| 9,508,051 B2 | 11/2016 | Falk | |
| 9,535,674 B2 | 1/2017 | Cooper | |
| 9,535,737 B2 | 1/2017 | Joy | |
| 9,557,969 B2 | 1/2017 | Sharma | |
| 9,613,070 B2 | 4/2017 | Kumar | |
| 9,626,710 B1 * | 4/2017 | Chheda | G06F 9/5061 |
| 9,645,833 B2 | 5/2017 | Mueller | |
| 9,654,473 B2 | 5/2017 | Miller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,852,165 B2 | 12/2017 | Morozov | |
| 10,002,203 B2 | 6/2018 | George | |
| 2008/0301702 A1 * | 12/2008 | Gibbs | G06F 8/30 719/311 |
| 2010/0131940 A1 * | 5/2010 | Jazdzewski | G06F 8/71 717/170 |
| 2014/0032467 A1 * | 1/2014 | Reddy | G06N 20/00 706/46 |
| 2018/0088925 A1 * | 3/2018 | Emeis | G06T 11/206 |
| 2018/0349125 A1 * | 12/2018 | Ito | H04N 1/00344 |

* cited by examiner

SYSTEM AND METHOD FOR VERSIONED SCRIPT MANAGEMENT

BACKGROUND

The present disclosure relates generally to version management, and more specifically, to script version management on a cloud-computing platform.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

A client instance hosted by the cloud computing service may include a number of scripts that provide various functionality. A script may load and utilize instructions from other scripts (e.g., common scripts, script libraries) that provide collections of defined functions that can be loaded and called by the script to perform certain tasks. For example, rather than have a developer define a binary array search function anew in several scripts that are being developed, the developer could instead have a script load a particular script library (e.g., binary_array_search.js) that defines a general binary search function, and the script can then call this binary search function to perform the desired search operation on a particular data structure. Additionally, the client instance may include other objects, such as applications that are not written in a scripting language, which may also load and call these script libraries to perform predefined tasks during operation. As such, using script libraries in this manner increases code reuse and reduces development time and cost.

The cloud computing service may regularly and/or intermittently provide updates to the scripts of the client instance as part of a platform release, in which certain existing scripts may be replaced by new versions. Such updates may be regularly or intermittently provided, for example, to address a logical error in the existing script or to improve the performance of the script.

Additionally, apart from logical errors, it is presently recognized that an existing script may operate in a particular manner under certain circumstances, and this behavior may be undesirable or unexpected to certain developers and not others. As such, once a script has been deployed as part of a platform release, it is a challenge to modify the script without introducing regressions in objects of the client instance that rely on this script. For example, a particular script (e.g., a script library) may define a find function having suitable instructions to find a given value (e.g., a string value or an integer value) in an array. However, based on the particular design, the find function may be unable to successfully locate certain values (e.g., zero, null, empty string) in a given array. As such, even when the array provided to this example find function does contain a zero, a null value, or an empty string, the find function returns false when searching for these values, which may be taken as an indication that these values are not actually present within the array. While a patch or other platform release update could be deployed to the client instance to modify the instructions and behavior of the script, many different objects associated with the client instance may utilize this script and may be designed to rely on this unique behavior to properly function. As such, while modifying the behavior of the find function to be able to correctly locate zero values, null values, and/or empty strings may be desired by certain developers, it may also result in creating a number of undesired regressions in objects of the client instance that depend on the original behavior of the script. Additionally, after a script has been deployed to a particular client instance, a developer may modify the script to change the behavior of the find function for that client instance, and may subsequently design objects in the client instance that rely on the modified behavior of the function. In such situations, the modified script library may be overwritten with the subsequent platform update, reverting the script library to the original behavior and introducing a number of undesirable regressions in objects of the client instance that depend on the original behavior of the modified script.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to a versioned script management (VSM) system that enables a client instance to implement versioned script management. The disclosed design includes a versioned scripts table having one or more version information fields storing version information for each script. The version information stored in the scripts table tracks platform release information (e.g., family, patch, and/or hotfix release version information) of each script, while also tracking client-specific versions of these scripts that have been modified after a platform release. The VSM system includes instructions that enable the client instance to transition from unversioned script management to versioned script management. For example, embodiments of the VSM system may include instructions to populate the versioned scripts table for existing unversioned scripts of a client instance, as well as instructions to update instructions of objects of the client instance to load versioned scripts. Additionally, embodiments of the VSM system may include instructions to create a modified version of an existing script, as well as instructions to perform a platform release update of platform scripts without overwriting or changing the behavior of client-modified versions of these scripts.

As such, the disclosed VSM system enables improved tracking and management of scripts. For example, the disclosed VSM system can apply platform release updates to scripts of a client instance without the possibility of introducing regressions. This enables a client to immediately apply platform release updates without the concern that the behavior of scripts, and objects that load and utilize these scripts, will be undesirably modified as a result of the update. This also provides the cloud-based platform provider greater freedom with respect to the platform release schedule, as clients that do not wish to wait for a platform release update can proceed to modify a platform script with the confidence that the script will not be automatically replaced when the platform release is later applied. Additionally, using the stored version information, the disclosed VSM system enables improved tracking of the historical changes to a script as part of platform release updates and client-specific modifications.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
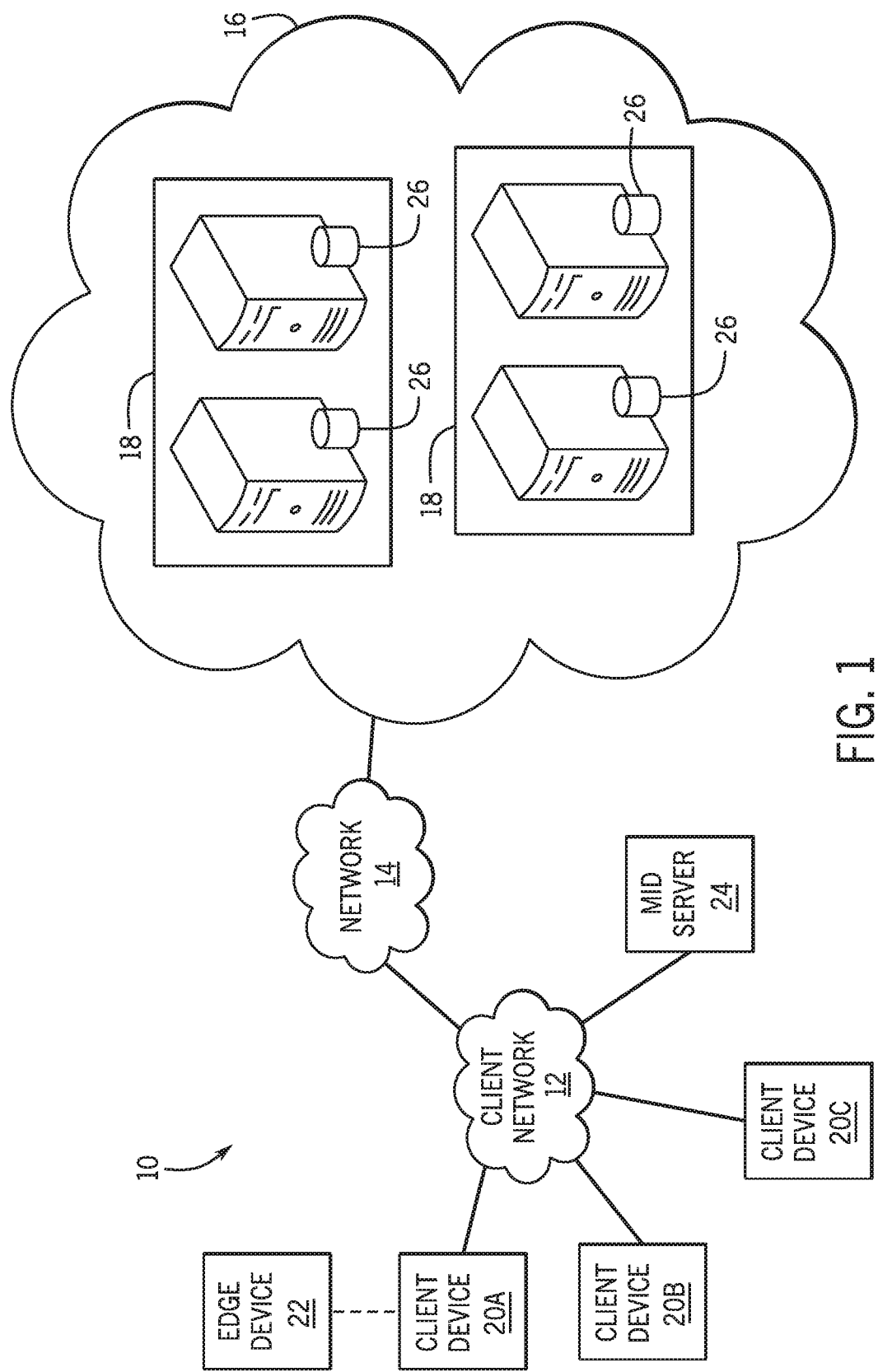
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, device, piece of software, database table, script, webpage, piece of metadata, and so forth) in an enterprise network, for which relevant data, such as manufacturer, vendor, location, or similar data, is stored in a configuration management database (CMDB). As used herein, a "regression" refers to a loss of previously existing functionality in an object of a client instance. As used herein, an "object" of a client instance is an object, in accordance with object-oriented programming designs, that includes instructions that are executed or interpreted by a processor.

A non-limiting list of example objects includes scripts, applications, event handlers, business rules, and so forth.

Present embodiments are directed to a versioned script management (VSM) system that enables a client instance to implement versioned script management. The disclosed design includes a versioned scripts table having one or more version information fields storing version information for each script. The version information tracks platform release information (e.g., family, patch, and/or hotfix release version information) of each script, while also tracking client-specific versions of these scripts that have been modified after a platform release. The VSM system includes instructions that enable the client instance to transition from unversioned script management to versioned script management. For example, as discussed below, certain embodiments of the VSM system include instructions to populate the versioned scripts table for existing unversioned scripts of a client instance, as well as instructions to update instructions of objects of the client instance to load versioned scripts. Additionally, certain embodiments of the VSM system include instructions to create a modified version of an existing script, as well as instructions to perform a platform release update of platform scripts without overwriting or changing the behavior of client-modified versions of these scripts.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
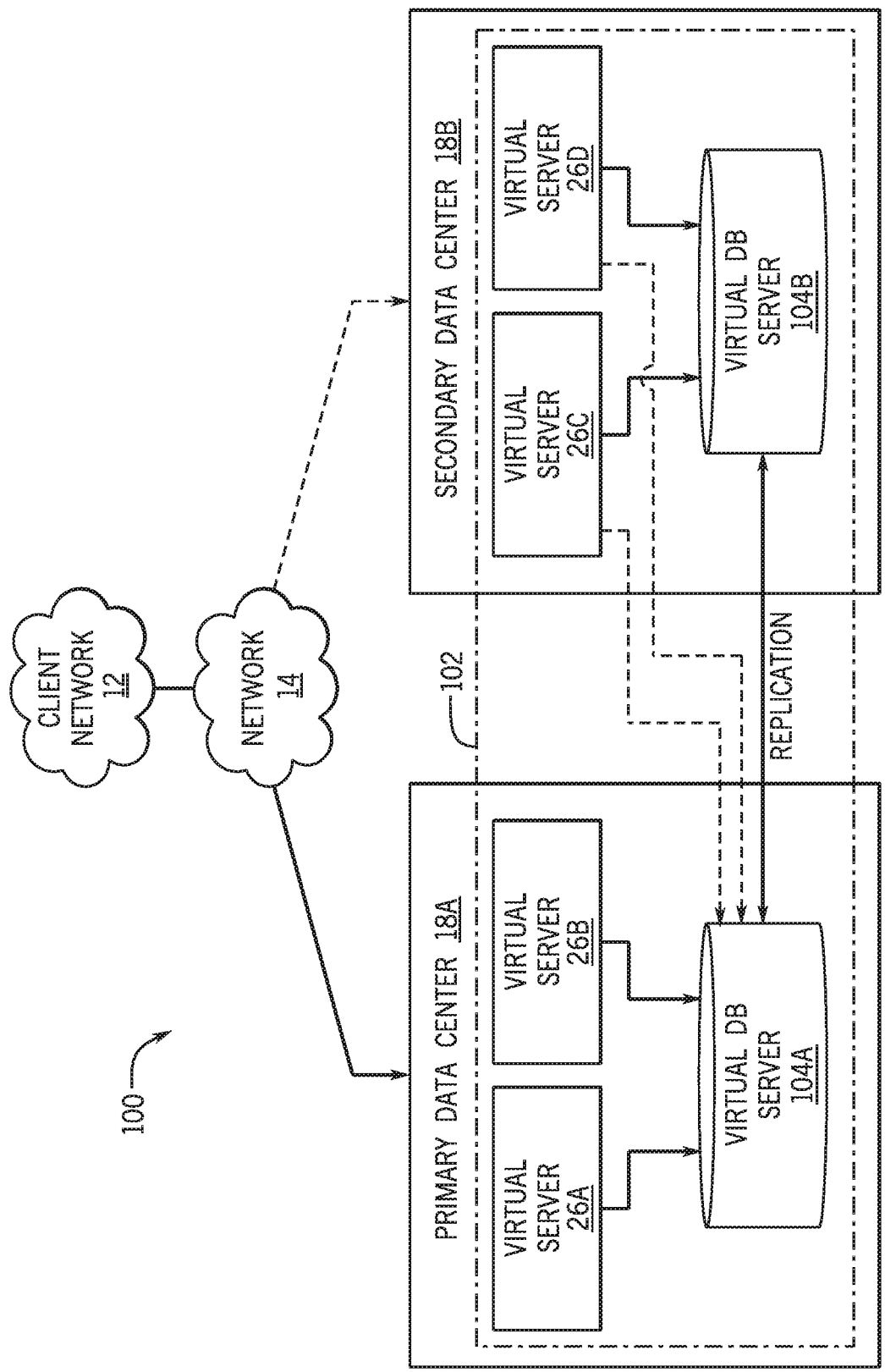
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
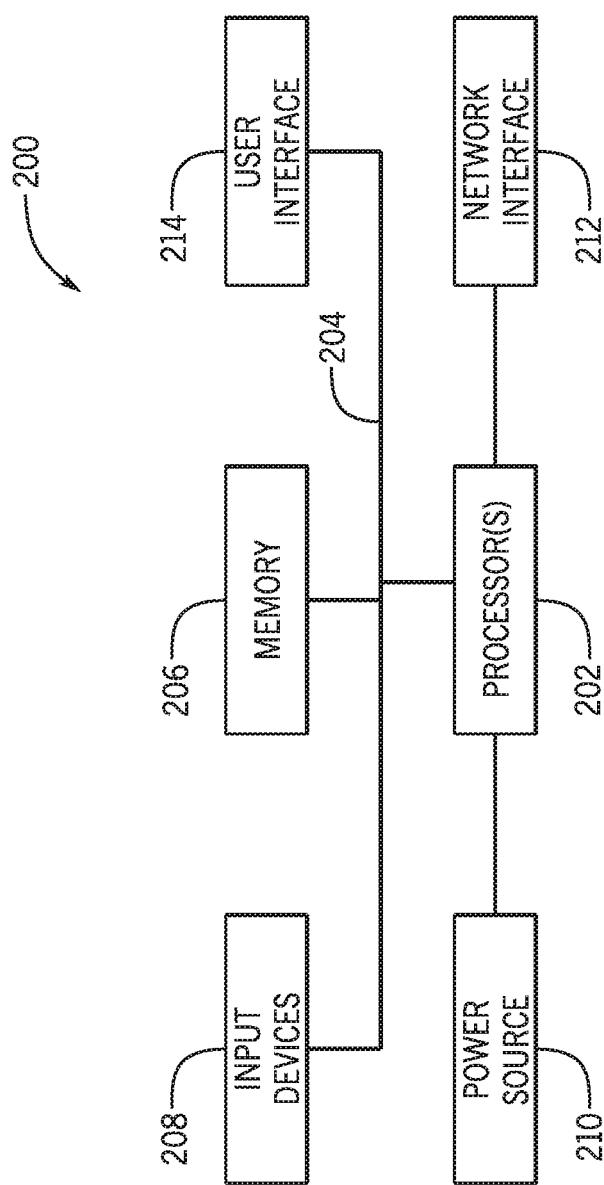
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
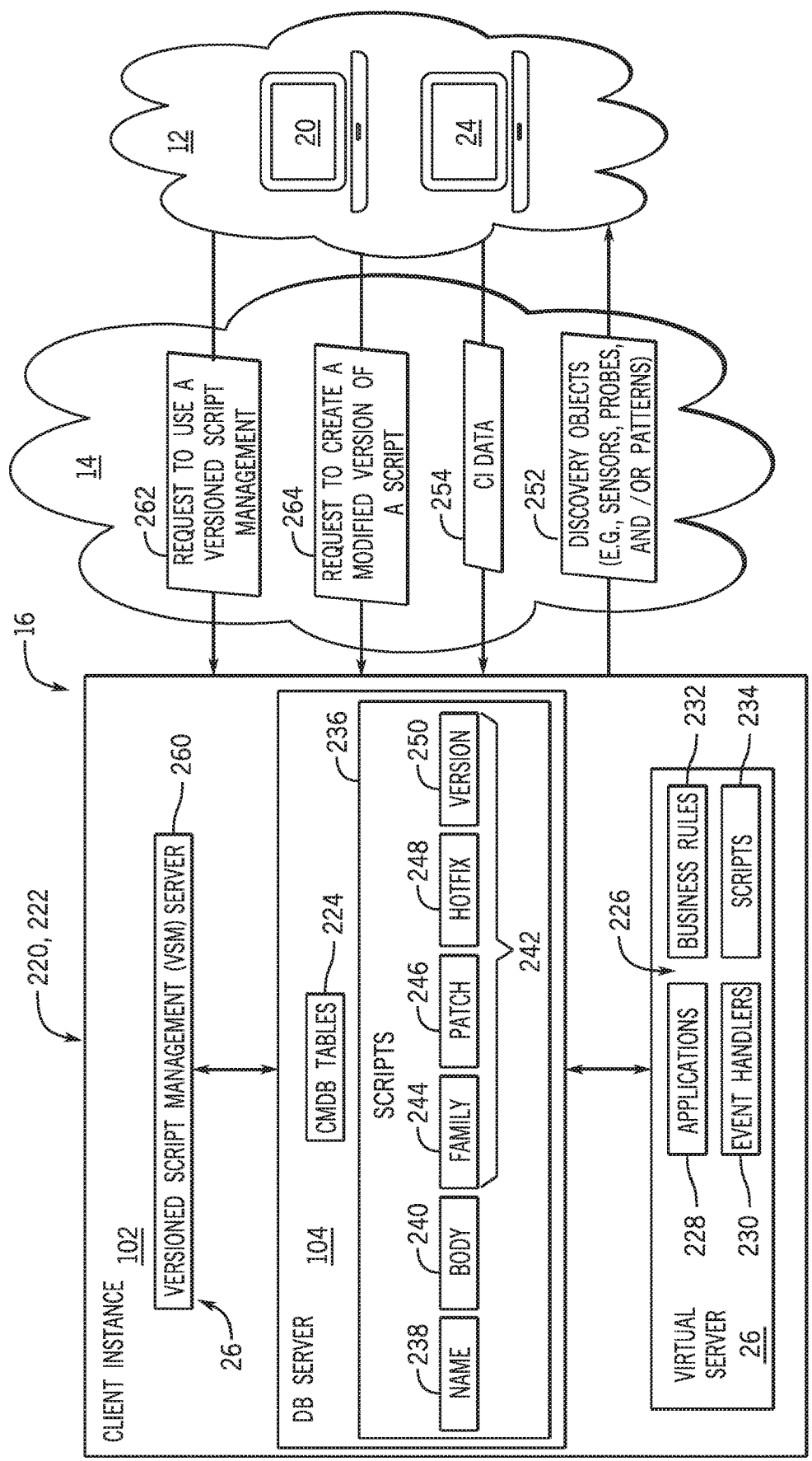
FIG. 4 is a block diagram illustrating an embodiment in which a client instance includes a versioned script management (VSM) server that enables multiple versions of scripts to be stored and used by objects associated with the client instance, in accordance with aspects of the present disclosure.

With the preceding in mind, FIG. 4 is a block diagram illustrating an embodiment in which virtual servers 26 support and enable the client instance 102, which includes a versioned script management (VSM) system 220, according to one or more disclosed embodiments. More specifically, FIG. 4 illustrates an example of a portion of a service provider cloud infrastructure, including the cloud-based platform 16 discussed above. As noted herein, the cloud-based platform 16 is connected to a client device 20 via the network 14 to provide a user interface to network applications executing within the client instance 102 (e.g., via a web browser running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

The client instance 102 and the VSM system 222 includes and is supported by DB server 104. In certain embodiments, the client instance 102 hosts a CMDB 222. For such embodiments, the illustrated DB server 104 includes one or more CMDB tables 224 that store CI data for one or more CIs associated with the operation of a managed client network 12. The illustrated client instance 102 includes a virtual server 26 hosting a number of objects 226 (e.g., code objects, instruction objects, executable objects, interpretable objects) associated with the client instance 102. For example, these objects 226 may include applications 228, event handlers 230, business rules 232, and scripts 234 associated with the client instance 102. Each of these objects 226 may include computer-implemented instructions that are performed (e.g., interpreted and/or executed) by a processor of a virtual server 26 to perform certain tasks. For example, in certain embodiments, these objects 226 may include applications 228 that enable users to access and modify CMDB data in the CMDB tables 224.

The illustrated DB server 104 stores a versioned scripts table 236 (also referred to herein as a simply "scripts table") that stores data relating to scripts of the client instance 102. The scripts table 236 includes a name field 238 that is configured to store a string value for the name of a script, a body field 240 that is configured to store the body (e.g., the instructions) of the script, and a number of version information fields 242 configured to store version information of the script. For the illustrated embodiment, the version information fields 242 are designed to track platform release information for a script, as well as track scripts that have been modified for a particular client instance 102. For example, a script (e.g., a platform script) may be defined as part of a platform release provided by the cloud-based platform 16, which creates and updates objects 226 associated with the client instance 102. In certain embodiments, these platform releases may correspond to a family release, a patch release, or a hotfix release. For example, a new script may be associated with a particular family release, which represents the largest and least frequent platform releases for the client instance 102. Between family releases, a new patch release or a new hotfix release may be provided to update the script of the client instance 102, for example, to correct a logical error in the instructions of the script. Additionally, a script that is part of a platform release (e.g., a family release, a patch release, and/or a hotfix release), may be modified by the client after release to operate in a different manner that is specific to the needs of the client.

With the forgoing in mind, for the illustrated embodiment, the version information fields 242 of the scripts table 236 include a family field 244 configured to store a string value for the name of the family platform release associated with a script, a patch field 246 configured to store a string value for the name or designation of a patch release associated with the script, a hotfix field 248 configured to store a string value for the name or designation of the hotfix release associated with the script, and a version field 250 configured to store an integer value indicating a version number or iteration of the script. As discussed below, for the illustrated embodiment, the version information stored by the family field 244, the patch field 246, and/or the hotfix field 248 corresponds to the platform release information (e.g., platform release values) of a script, while the version field 250 is used to track versions of the script that are modified after a platform release of the script (e.g., client instance-specific versions). It may be noted that the version information fields 242 may be different in other embodiments. For example, in other embodiments, fewer or additional version information fields 242 may be used. By way of specific example, in certain embodiments, a single version information field may be used that includes a string concatenation of the values of the family field 244, the patch field 246, the hotfix field 248, and the version field 250 of the illustrated embodiment.

While only the scripts table 236 is illustrated for simplicity, in certain embodiments, each of the objects 226 hosted by the virtual server 26 is stored in a respective table (e.g., an application table, an event handler table, a business rules table) hosted by the DB server 104. It may also be noted that, prior to switching to versioned script management, the DB server 104 may store an unversioned scripts table, which may include the name field 238 and the body field 240, but lack the version information fields 242. Furthermore, it should be appreciated that, while the VMS system 222 is discussed herein in the specific context of script version management, the same version management could be similarly applied to other objects 226 of the client instance 102, in accordance with the present disclosure.

During the operation of the client instance 102, the execution of one of the objects 226 may result other objects 226 being performed (e.g., interpreted and/or executed) by one or more of the virtual servers 26 of the client instance 102. For example, one of the applications 228 may include instructions that, when performed by the virtual server 26, causes one or more of the scripts 234 to be loaded from the scripts table 236 and functions of the script to be called and executed by the virtual server 26. Similarly, one of the event handlers 230 or business rules 232 may include instructions that are executed in response to a particular condition being met (e.g., a particular change to data stored in one or more of the CMDB tables 224), and these instructions may cause one or more of the scripts 234 to be loaded from the scripts table 236 and executed by the virtual server 26. Additionally, during a discovery operation, as discussed above, the MID server 24 may receive discovery objects 252 from the client instance 102 that include instructions to be performed (e.g., interpreted and/or executed) by the MID server 24, or another suitable device associated with the client network 12, to discover CI data 254 regarding CIs associated with the client network 12 that is subsequently stored in the CMDB table 224 of the DB server 104. In certain embodiments, these discovery objects 252 may be or include scripts 234 that are stored in the scripts table 236 hosted by the DB server 104 of the client instance 102.

For the embodiment of the VSM system 220 illustrated in FIG. 4, a virtual server 26 of the client instance 102 hosts a versioned script management (VSM) server 260. In certain embodiments, both the objects 226 and the VSM server 260 may be hosted (e.g., performed, executed, interpreted) by the same virtual server 26, while in other embodiments, they may be hosted by separate virtual servers 26 associated with the client instance 102. As discussed below, the VSM server 260 includes instructions that, when performed by the virtual server 26, enables the client instance 102 to use (e.g., access, load, and update) versioned scripts 234. For example, as discussed with respect to FIGS. 5-7, the VSM server 260 may receive a request 262 from the client device 20 for the client instance 102 to switch from using unversioned scripts to using versioned script management, and in response, may perform a number of automated and/or human-guided actions to implement versioned script management within the client instance 102. As discussed with respect to FIG. 9, the VSM server 260 may receive a request 264 (e.g., from the client device 20) to create a modified version of a script, and in response, may define a new entry in the scripts table 236 for the modified version of the script.

Figure 5:
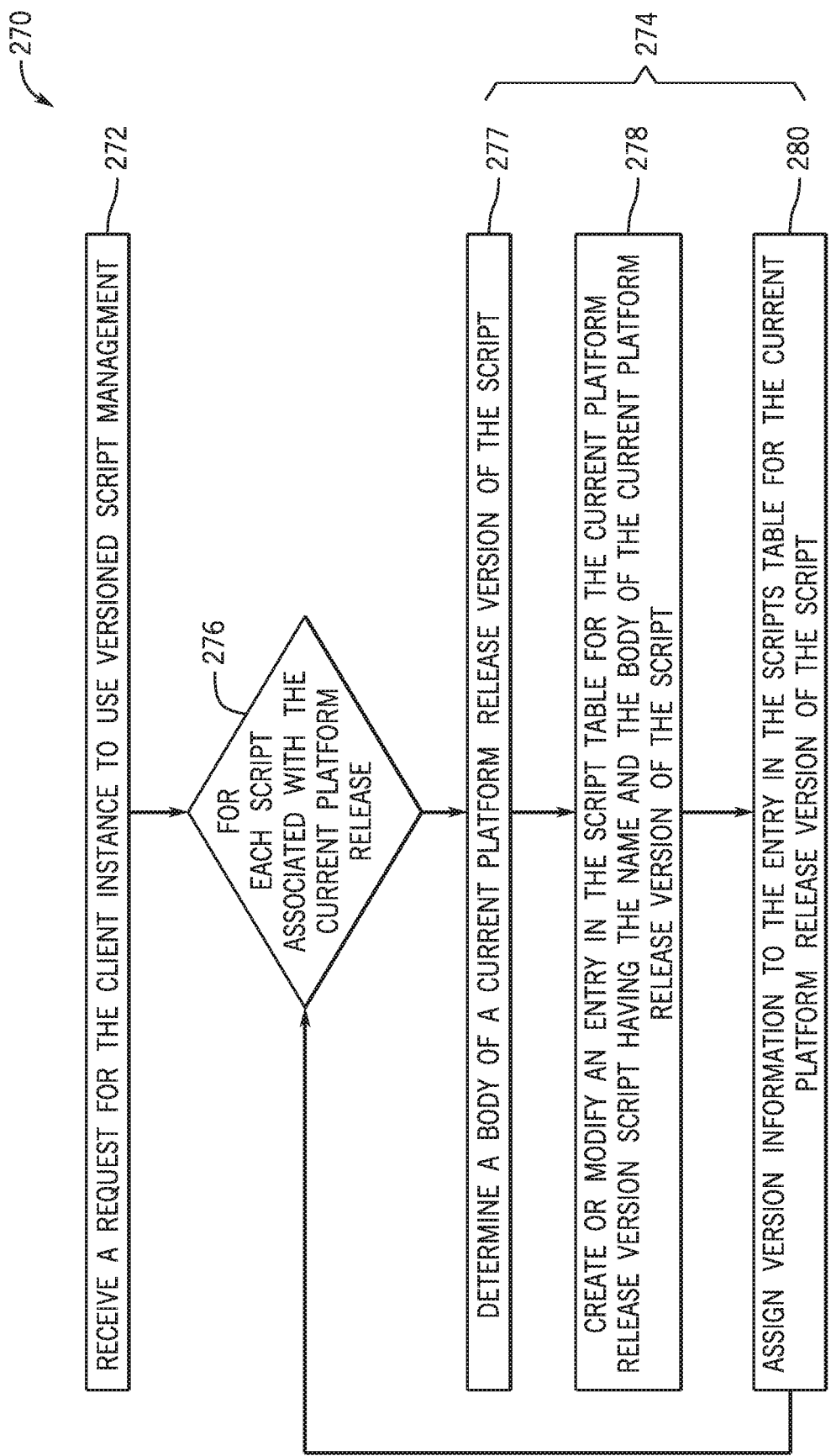
FIG. 5 is a flow diagram illustrating an embodiment of a process whereby the VSM server handles platform release versions of scripts when switching the client instance to versioned script management, in accordance with aspects of the present disclosure.

With the foregoing in mind, FIG. 5 is a flow diagram illustrating an embodiment of a process 270 whereby the VSM server handles platform release versions of scripts when switching the client instance 102 to versioned script management. In certain embodiments, the process 270 may be stored as instructions in a suitable memory (e.g., memory 206) and executed by a suitable processor (e.g., processor(s) 202) associated with the VSM server 260 and the client instance 102. The process 270 is merely illustrated as an example, and in other embodiments, the process 270 may include additional steps, omitted steps, repeated steps, and so forth, in accordance with the present disclosure. Additionally, the process 270 of FIG. 5 is discussed with reference to elements illustrated in FIG. 4.

For the embodiment illustrated in FIG. 5, the process 270 begins with the VSM server 260 receiving (block 272) the request 262 for the client instance 102 to transition from using unversioned script management to using versioned script management. In certain embodiments, the VSM server 260 may first determine that the request 262 was received from a user having suitable authority to request the change. For example, the VSM server 260 may ensure that the request 262 was received from a particular user, a user having a particular role, and/or a particular client device 20 before proceeding to switch the client instance 102 to versioned script management.

For the embodiment of the process 270 illustrated in FIG. 5, the VSM server 260 then performs a number of actions 274 for each script associated with the current platform release being used by the client instance 102 (e.g., each currently unversioned platform script), as indicated by the for-loop 276. The actions 274 of the for-loop 276 include the VSM server 260 first determining (block 277) a body of a current platform release version of the script based on the name of the script in the current iteration of the for-loop 276. For example, the VSM server 260 may access a shared or enterprise instance to request and receive the body of the current platform release version of the script.

The actions 274 of the for-loop 276 continue with the VSM server 260 creating (block 278) an entry in the scripts table 236 for the current platform release version script, in which the entry includes the name of the script in the name field 238 and the body of the current platform release version of the script in the body field 240. The VSM server 260 also assigns (block 280) version information to the entry in the scripts table 236 based on the current platform release information. For example, using the version information technique set forth above, the VSM server 260 may assign values to the family field 244, the patch field 246, and the hotfix field 248 based on the family, patch, and hotfix values associated with the current platform release. Additionally, the VSM server 260 may assign an initial version value (e.g., 0) to the version field 250 of the new entry. Once the VSM server 260 has completed the actions 274 of the for-loop 276, the VSM server 260 selects the next script associated with the client instance 102 and repeats the actions 274 associated with the for-loop 276. As such, at the conclusion of the process 270, the scripts table 236 is populated with entries for all of the current platform release version of each of the scripts 234 of the client instance 102.

As mentioned, in certain embodiments, prior to switching to versioned script management, existing scripts of the client instance 102 may be stored in a different table (e.g., an unversioned script table) of the DB server 104, and as such, separate new entries may be created in the scripts table 236 for each of the current platform release versions of scripts in block 278. In other embodiments, an unversioned script table that stores existing scripts prior to the switch to versioned script management may instead be modified to include the version information fields 242 (e.g., the family field 244, the patch field 246, the hotfix field 248, the version field) to yield the versioned scripts table 236. For such embodiments, the existing entries in this modified table are instead updated, as needed, in blocks 278 and 280 to ensure that the resulting scripts table 236 includes all of the current platform release versions of the scripts of the client instance 102, as well as suitable version information. In certain embodiments, the VSM server 260 may compare the body of the existing script to the body of the current platform release version of the script to ensure that the script has not been modified since the associated platform release. The VSM server 260 may handle such modified scripts using the process discussed with respect to FIG. 6 below.

It may also be noted that the client instance 102 may also include custom scripts that are not part of a platform release (e.g., custom non-platform release scripts). That is, the client instance 102 may include one or more scripts having names that are distinct from the names of the scripts of the platform release and, therefore, do not correspond to a platform release script. In certain embodiments, the VSM server 260 may handle these custom scripts in a similar manner to the process 270 illustrated in FIG. 5, with the principle difference being that, since there is not a corresponding platform release version of such a custom script, the VSM server 260 instead uses the body of the custom script to create or modify the entry in the scripts table 236 in block 278, as discussed above, and assigns an initial version value (e.g., 0) to the version field 250 of the entry in block 280.

Figure 6:
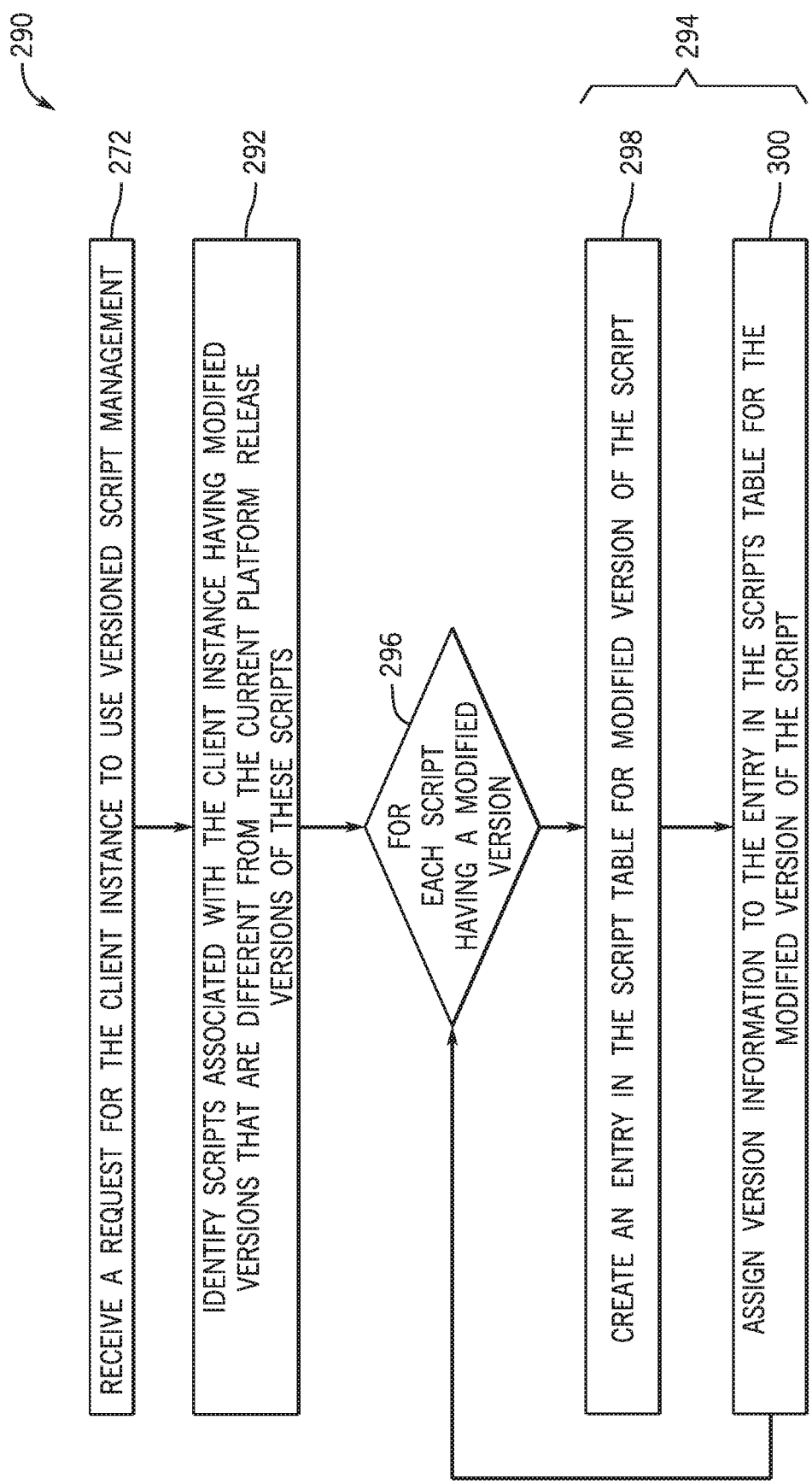
FIG. 6 is a flow diagram illustrating an embodiment of a process whereby the VSM server handles modified versions of scripts when switching the client instance to versioned script management, in accordance with aspects of the present disclosure.

FIG. 6 is a flow diagram illustrating an embodiment of a process 290 whereby the VSM server 260 handles modified versions of scripts when switching the client instance 102 to versioned script management. In certain embodiments, the process 290 may be stored as instructions in a suitable memory (e.g., memory 206) and executed by a suitable processor (e.g., processor(s) 202) associated with the VSM server 260 and the client instance 102. The process 290 is merely illustrated as an example, and in other embodiments, the process 290 may include additional steps, omitted steps, repeated steps, and so forth, in accordance with the present disclosure. Additionally, the process 290 of FIG. 6 is discussed with reference to elements illustrated in FIGS. 4 and 5.

For the embodiment illustrated in FIG. 6, the process 290 begins with the VSM server 260 receiving (block 272) the request 262 for the client instance 102 to switch to using versioned script management. In certain embodiments, after receiving the request 262, the VSM server 260 may first complete the process 270 of FIG. 5 before proceeding through the process 290 of FIG. 6, while in other embodiments, the processes 270 and 290 may be separately or independently executed. As illustrated in FIG. 6, the VSM server 260 identifies (block 292) platform scripts of the client instance 102 that have been modified since their corresponding platform release. In other words, the VSM server 260 identifies scripts of the client instance 102 that have the same name as a script of the current platform release and include different instructions.

In an embodiment in which the VSM server 260 first completes the process 270 of FIG. 5, the scripts table 236 is already populated with entries with version information for all of the platform release versions of all the platform scripts that are associated with the client instance 102. As such, in block 292, the VSM server 260 may compare the bodies of each of the scripts of the client instance 102 to the bodies of the platform release versions of scripts in the scripts table 236 having the same name. When a script of the client instance 102 has the same name as a platform release version of a script stored in the scripts table 236 and does not have the same body, then the VSM server 260 identifies the script as being a modified version of the platform release version of the script.

For the embodiment of the process 290 illustrated in FIG. 6, the VSM server 260 then performs a number of actions 294 for each of the modified versions of a platform script identified in block 292, as indicated by the for-loop 296. The actions 294 of the for-loop 296 include the VSM server 260 creating (block 298) an entry in the scripts table 236 for the modified version of the script, wherein the entry includes the name of the modified version of the script in the name field 238 and the body of the modified version of the script in the body field 240. As noted above, for embodiments in which an existing, unversioned scripts table was modified to include the additional version information fields 242, the modified version of the script may already be stored in the scripts table 236 without the version information fields 242 populated. For such embodiments, the actions of block 298 may be skipped.

For the embodiment of the process 290 illustrated in FIG. 6, the actions 294 of the for-loop 296 continue with the VSM server 260 assigning (block 300) version information to the entry in the scripts table 236 for the modified version of the script. For example, using the version information technique set forth above, the VSM server 260 may assign values to the family field 244, the patch field 246, and the hotfix field 248 based on the family, patch, and hotfix values associated with the current platform release. Additionally, the VSM server 260 may assign a next available version value (e.g., 1) to the version field 250 of the new entry. That is, the VSM server 260 may first determine that there is already a current platform release version of the script in the script table having the same values in the name field 238, family field 244, patch field 246, and hotfix field 248, and that this current platform release version of the script has already been assigned the lowest initial version value (e.g., 0) in the version field 250. In response, the VSM server 260 may increment or select the next available version value, and assign this to the version field 250 for the modified version of the script in the scripts table 236. Once the VSM server 260 has completed the actions 294 of the for-loop 296, the VSM server 260 selects the next script having a modified version and repeats the actions 294 associated with the for-loop 296. As such, at the conclusion of the processes 270 and 290, the scripts table 236 is populated with entries for the current platform release version of each of the scripts 234 of the client instance 102, as well as entries for any versions of these scripts that have been modified or customized in the client instance 102 since the current platform release update was applied.

Figure 7:
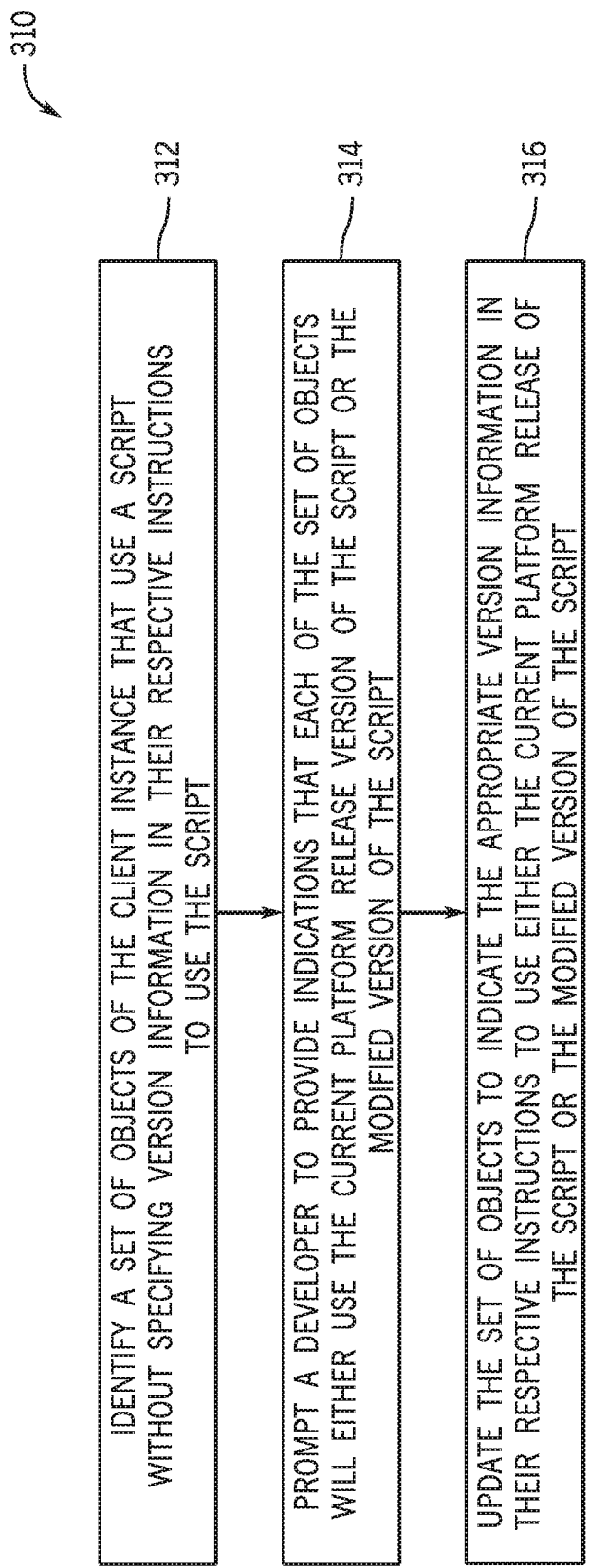
FIG. 7 is a flow diagram illustrating an embodiment of a process whereby the VSM server updates objects of the client instance to instead use a versioned script when switching the client instance to versioned script management, in accordance with aspects of the present disclosure.

FIG. 7 is a flow diagram illustrating an embodiment of a process 310 whereby the VSM server 260 updates objects 226 of the client instance 102 to instead use a versioned script when switching the client instance to versioned script management. In certain embodiments, the process 310 may be stored as instructions in a suitable memory (e.g., memory 206) and executed by a suitable processor (e.g., processor(s) 202) associated with the VSM server 260 and the client instance 102. The process 310 is merely illustrated as an example, and in other embodiments, the process 310 may include additional steps, omitted steps, repeated steps, and so forth, in accordance with the present disclosure. Additionally, the process 310 of FIG. 7 is discussed with reference to elements illustrated in FIG. 4.

For the embodiment illustrated in FIG. 7, the process 310 begins with the VSM server 260 identifying (block 312) a set of objects of the client instance 102 that use (e.g., load or call) a script without specifying version information. For example, prior to switching the client instance 102 to versioned script management, an object, such as a first script, may call an include_script function to load a second script, wherein the include_script function expects to receive a single string parameter that stores the name of the script to be loaded. In certain embodiments, upon switching to versioned script management, the include_script function may either be modified or replaced by another function (e.g., include_script_version) that, in addition to the name parameter, can receive one or more parameters storing version information for the script to be loaded. As such, in block 312, the VSM server 260 may determine which objects 226 associated with the client instance 102 have calls to the include_script function that lack parameter values with version information.

In certain embodiments of the process 310 illustrated in FIG. 7, the VSM server 260 may prompt (block 314) a developer to provide an indication that each of the objects 226 identified in block 312 will either use the modified version or the current platform release version of the script. For example, the request 262 received for the client instance 102 to switch to versioned script management may optionally include a parameter that indicates that the developer desires to manually select which version of a script should be used by each of the objects 226. For such cases, the VSM server 260 may provide the developer with a suitable graphical user interface (GUI), such as a table including a first column listing the name of the object, a second column having a first radio button to select the modified version of the script, and a third column having a second radio button to select the current platform version of the script. In certain implementations, the first radio button may be selected by default for each of the objects. The GUI may subsequently provide the selections of the developer to the VSM server 260 as the indications of which version of the script should be used by each of the objects 226. However, recognizing that the client instance 102 has presumably been using the modified version of the script as the only version of the script before switching the client instance 102 to versioned script management, in certain embodiments, the VSM server 260 may default to selecting the modified version of the script (e.g., the entry in the scripts table 236 having the indicated name and the highest version value) for all existing uses of the script in objects of the client instance 102, and the actions of block 314 may be skipped.

For the embodiment illustrated in FIG. 7, the process 310 concludes with the VSM server 260 updating (block 316) each of the objects 266 of the client instance 102 to indicate the correct version information in their respective instructions to use a script. The VSM server 260 may identify which objects 226 (e.g., scripts, applications, event handlers, business rules) of the client instance 102 load and call a particular script, and update the instructions of these objects to include the appropriate version information to either use the current platform release version or the modified version of the particular script. For example, the VSM server 260 may modify the calls to the include_script function in scripts 234 (or other objects 226 that previously utilized this function) to instead use the modified include_script function (e.g. include_script_version) and/or to provide both the name of the script and the version information as parameter values passed to the modified function. As discussed below, in other embodiments, versioned script management may be implemented in the client instance 102 without modifying existing object of the client instance 102 that use a script without providing version information in the call to load the script. For such embodiments, the process 310 of FIG. 7 may not be performed, which may reduce developer time and development costs.

Figure 8:
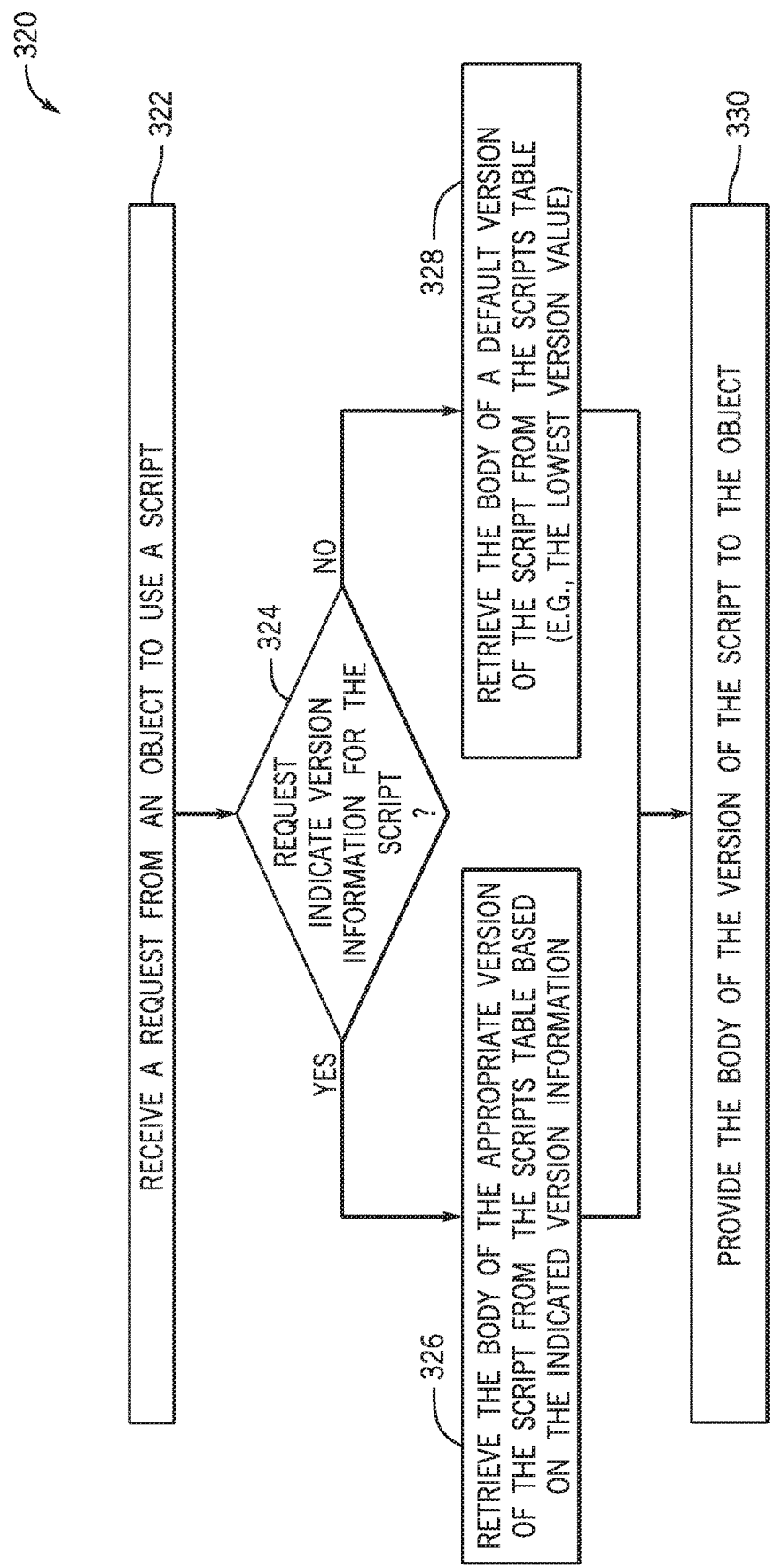
FIG. 8 is a flow diagram illustrating an embodiment of a process whereby the VSM server receives and fulfills a request to load a script, in accordance with aspects of the present disclosure.

Once the client instance 102 has been switched to versioned switch management and the scripts table 236 has been populated with the appropriate version information, for example, using the processes 270 and 290 of FIGS. 5 and 6, then the VSM server 260 may respond to a request or call by one of the objects 266 to use a scripts by providing a suitable version of the requested script. For example, FIG. 8 is a flow diagram illustrating an embodiment of a process 320 whereby the VSM server 260 receives and fulfills a request to load a script. In certain embodiments, the process 320 may be stored as instructions in a suitable memory (e.g., memory 206) and executed by a suitable processor (e.g., processor(s) 202) associated with the VSM server 260 and the client instance 102. The process 320 is merely illustrated as an example, and in other embodiments, the process 320 may include additional steps, omitted steps, repeated steps, and so forth, in accordance with the present disclosure. Additionally, the process 320 of FIG. 8 is discussed with reference to elements illustrated in FIG. 4.

For the embodiment illustrated in FIG. 8, the process 320 begins with the VSM server 260 receiving (block 322) a request from one of the objects 266 to use a script. For example, one of the scripts 234 being executed by the virtual server 26 may have an include_script function call in its instructions. As noted above, in certain embodiments, upon switching to versioned script management, the include_script function may be modified such that, in addition to the name parameter, the function can receive one or more parameters storing version information for the script to be loaded, as discussed above with respect to FIG. 7. For the embodiment illustrated in FIG. 8, the include_script function is modified in such a manner as to handle calls to load scripts that include version information by loading the corresponding version of the script from the scripts table 236, and also to handle calls to load scripts that lack version information by loading a default (e.g., a current platform release version, a latest modified version) of the script.

Continuing through the embodiment of the process 320 illustrated in FIG. 8, the VSM server 260 determines whether the received request indicates version information of the script, as indicated by the decision block 324. When the VSM server 260 determines that the request includes version information, then the VSM server 260 uses this version information to retrieve (block 326) the body of the appropriate version of the script from the body field 240 of the scripts table 236 based on the indicated version information. For example, the request received at block 322 may provide values for the name field 238, the family field 244, the patch field 246, the hotfix field 248, and/or the version field 250, and the VSM server 260 may use these received parameter values to query the scripts table 236 and retrieve the body of the appropriate script.

For the embodiment of the process 320 illustrated in FIG. 8, when the VSM server 260 determines that the request received in block 322 does not include version information, then the VSM server 260 may respond by retrieving (block 328) the body of a default version of the script from the body field 240 of the scripts table 236. For example, the request received in block 322 may provide only a value of the name field 238, and in response, the VSM server 260 may query the scripts table 236 to retrieve the body of the script that has the indicated name and also has the lowest or highest value in the version field 250. For embodiments in which the scripts table 236 was at least partially populated using the process 270 of FIG. 5, the lowest version value may correspond the current platform release version of the script having the indicated name, while the highest version value may correspond to the most recently client-modified version of the script having the indicated name. In certain embodiments, the VSM server 260 may be configured to use either the highest or the lowest version value, based on a configuration stored in the DB server 104.

For the embodiment illustrated in FIG. 8, the process 320 concludes with the VSM server 260 providing (block 330) the retrieved body of the appropriate version of the script to the requesting object. In certain embodiments in which the modified include_script function requires both a value for the name field 238 and version information, in block 328, the VSM server 260 may instead raise or return an error indicating incomplete or incorrect syntax for the function call. Similarly, the VSM server 260 may raise or return an error in response to the appropriate version of the script not being located in the scripts table 236 using the provided parameter values for the name field 238 and the version information fields 242.

Figure 9:
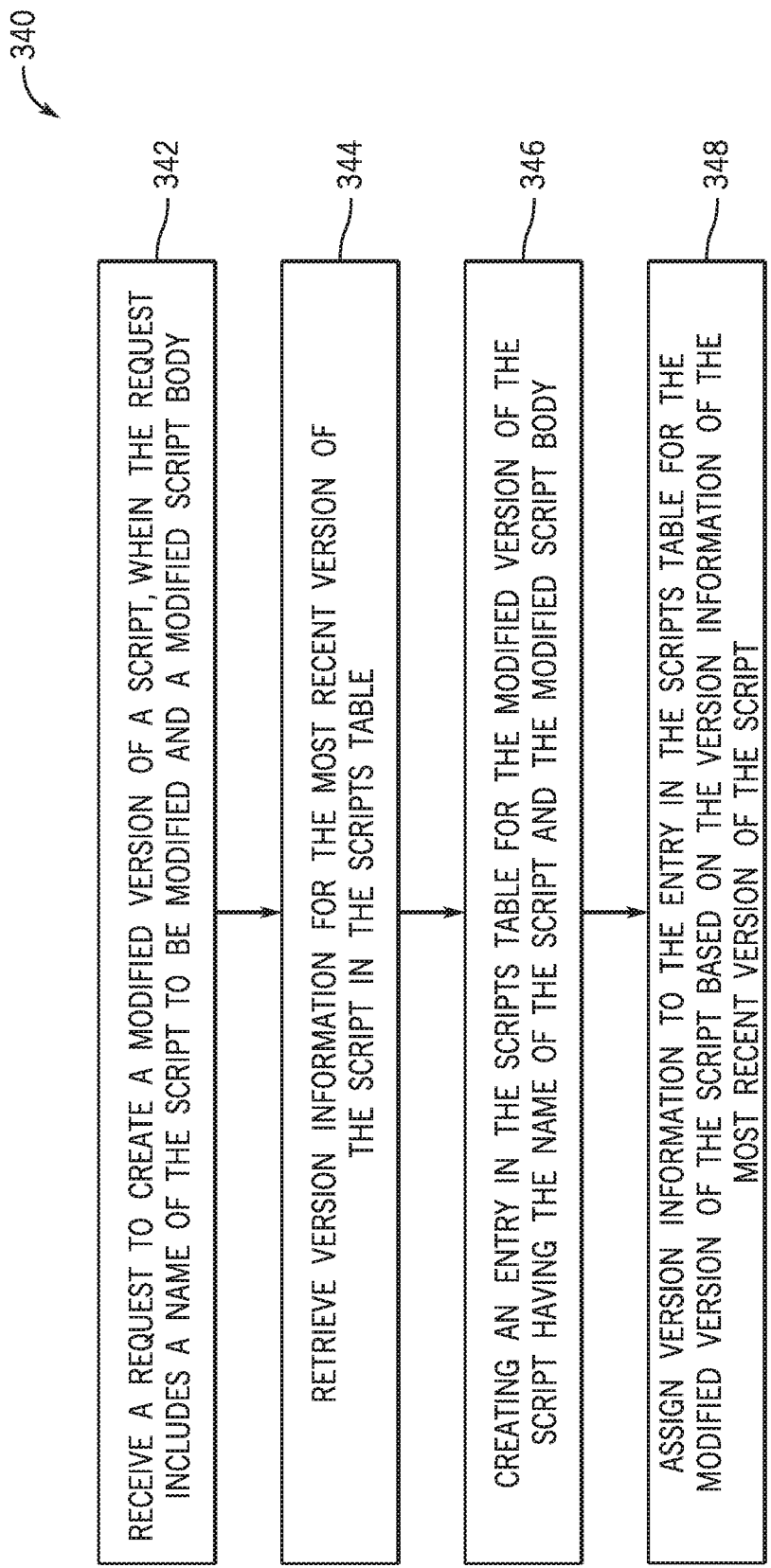
FIG. 9 is a flow diagram illustrating an embodiment of a process whereby the VSM server receives and fulfills a request to modify a script, in accordance with aspects of the present disclosure.

FIG. 9 is a flow diagram illustrating an embodiment of a process 340 whereby, after switching the client instance 102 to versioned script management, as discussed above, the VSM server receives and fulfills a request to modify a script. In certain embodiments, the process 340 may be stored as instructions in a suitable memory (e.g., memory 206) and executed by a suitable processor (e.g., processor(s) 202) associated with the VSM server 260 and the client instance 102. The process 340 is merely illustrated as an example, and in other embodiments, the process 340 may include additional steps, omitted steps, repeated steps, and so forth, in accordance with the present disclosure. Additionally, the process 340 of FIG. 9 is discussed with reference to elements illustrated in FIG. 4.

For the embodiment illustrated in FIG. 9, the process 340 begins with the VSM server 260 receiving (block 342) the request 264 to create a modified version of a script. For example, the request 264 may include a name of the script for which the new modified version will be created, as well as a modified script body for this modified version of the script. In response to receiving the request 264, the VSM server 260 queries the scripts table 236, based on the received name of the script, to retrieve (block 344) version information from the version information fields 242 for the most recent version of the script (e.g., highest value in the version field 250) prior to the presently requested modification of the script. The VSM server 260 creates (block 346) a new entry in the scripts table 236 having the name field 238 populated with the received name of the script, and having the body field 240 populated with the received modified script body.

For the embodiment of the process 340 illustrated in FIG. 9, the VSM server 260 also assigns (block 348) version information to the version information fields 242 of the new entry in the scripts table 236 for the modified version of the script. For example, using the version information technique set forth above for platform scripts, the VSM server 260 may assign values to the family field 244, the patch field 246, and the hotfix field 248 to the new entry that are the same as the family, patch, and hotfix values of the most recent version of the script determined in block 344. Additionally, the VSM server 260 may assign a next available version value (e.g., 2) to the version field 250 of the new entry in the scripts table 236. For example, in certain embodiments, the VSM server 260 may increment the value in the version field 250 retrieved for the most recent version of the script to determine the value for the version field 250 of the new entry in the scripts table 236.

Figure 10:
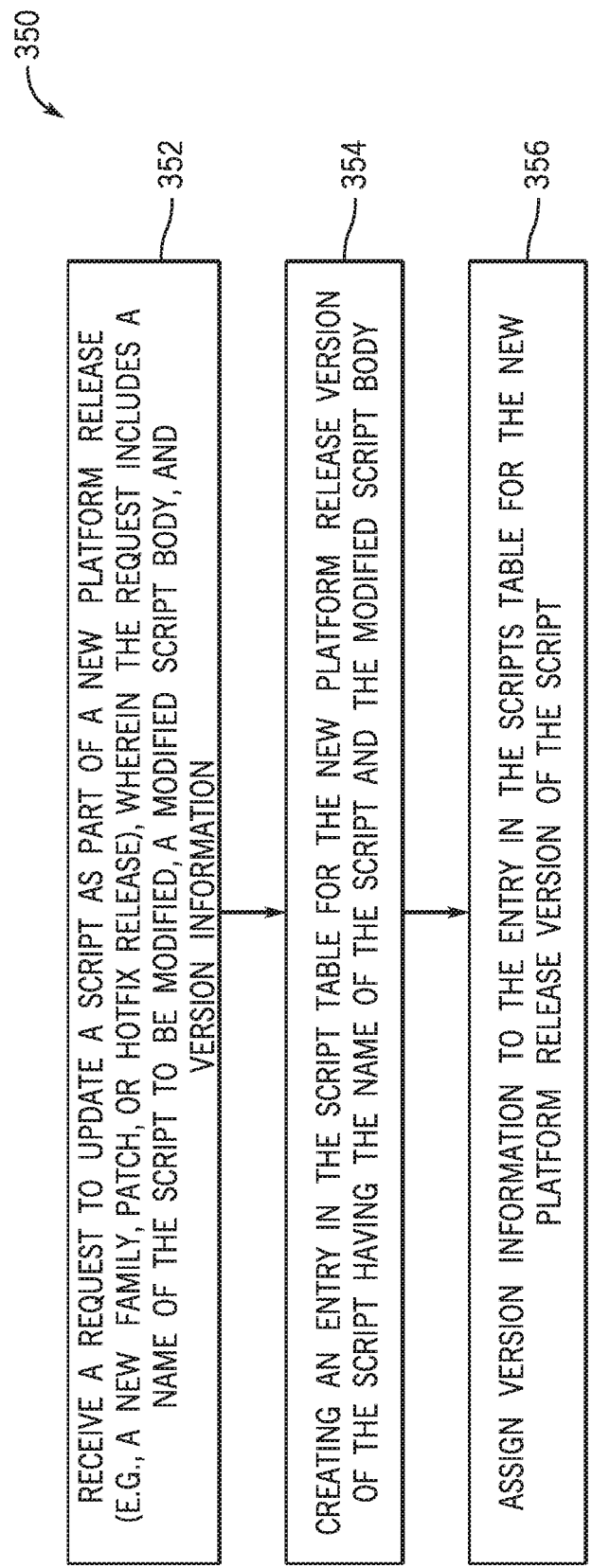
FIG. 10 is a flow diagram illustrating an embodiment of a process whereby the VSM server receives and fulfills a request to update a script as part of a new platform release, in accordance with aspects of the present disclosure.

At some point after the client instance 102 has been switched to versioned switch management and VSM server 260 has populated the scripts table 236 with the appropriate version information, as discussed above, client instance 102 may receive a platform release update that includes new versions of platform scripts stored in the scripts table 236. For example, FIG. 10 is a flow diagram illustrating an embodiment of a process 350 whereby, after switching the client instance 102 to versioned script management, as discussed above, the VSM server 260 receives and fulfills a request to modify a platform script as part of a new platform release. In certain embodiments, the process 350 may be stored as instructions in a suitable memory (e.g., memory 206) and executed by a suitable processor (e.g., processor(s) 202) associated with the VSM server 260 and the client instance 102. The process 350 is merely illustrated as an example, and in other embodiments, the process 350 may include additional steps, omitted steps, repeated steps, and so forth, in accordance with the present disclosure. Additionally, the process 350 of FIG. 10 is discussed with reference to elements illustrated in FIG. 4.

For the embodiment illustrated in FIG. 10, the process 350 begins with the VSM server 260 receiving (block 352) a request to update an existing platform script as part of a new platform release. For this example, an older version of the script was part of a previous platform release and has already been stored in the scripts table 236 with suitable version information, as described above. As discussed above, the platform release may be part of a new family release, a new patch release, and/or a new hotfix release. In certain embodiments, the update request may be received from an enterprise instance communicatively coupled to the client instance 102. For the illustrated example, the request includes a name of the script to be modified as part of the platform release, a modified script body, and version information (e.g., family, patch, and hotfix values) associated with the new platform release.

Continuing through the embodiment of the process 350 illustrated in FIG. 10, the VSM server 260 creates (block 354) a new entry in the scripts table 236 having the name field 238 populated with the received name of the script, and having the body field 240 populated with the received modified script body. The VSM server 260 also assigns (block 256) version information to the version information fields 242 of the new entry in the scripts table 236 using the version information included in the request received in block 352. For example, using the version information technique set forth above, the VSM server 260 may assign values to the family field 244, the patch field 246, and the hotfix field 248 to the new entry based on the family, patch, and hotfix values indicated in the request received in block 352. Additionally, the VSM server 260 may assign an initial version value (e.g., 0) to the version field 250 of the new entry in the scripts table 236, indicating that this is the earliest version of this script for the given family, patch, and hotfix values.

Once the VSM server 260 has completed the process 350 of FIG. 10 to add new entries to the scripts table 236 for the scripts that have been modified as part of the new platform release, in certain embodiments, the VSM server 260 may perform a process similar to the process 310 of FIG. 7 to update certain objects 226 of the client instance 102 to use the new platform release version of the script. To do so, the VSM server 260 may first identify a set of objects associated with the client instance 102 that use a current platform release version of a script for which a new platform release version has been added to the scripts table 236 by the process 350 of FIG. 10. For example, using the version information technique discussed above, the VSM server 260 may identify all of the objects 226 of the client instance 102 that use a script having family, patch, and/or hotfix values corresponding to the current platform release and the initial or lowest value (e.g., 0) in the version field 250, wherein another script exists in the scripts table 236 with the same name having family, patch, and/or hotfix values corresponding to the new platform release and the lowest value (e.g., 0) in the version field 250. As such, it should be appreciated that the VSM server 260 does modify objects 226 that use a modified version of a platform script, which prevents regressions being introduced in these objects 226 as a result of the platform update.

Like the process 310 of FIG. 7, the VSM server 260 may prompt a developer to provide an indication whether each of these objects 226 in the identified set will use the current platform release version of the script or the new platform release version of the script. The VSM server 260 may then update the instructions of each of these objects 226 to indicate the version information of either the current platform release version or the new platform release version of the script in each of their calls to use the script. In certain embodiments, the VSM server 260 may default to using the current platform release versions in each of the objects, which will ensure that objects will continue to use the current platform release versions of the scripts to avoid the possibility of introducing regressions in these objects 266. However, it may be appreciated that, by enabling a developer to select certain object to use a new platform release version of a platform script, the disclosed VSM server 260 enables potential improvements that may be provided by the new platform release version, such as improvements in efficiency and removal or modification of erroneous instructions (e.g., logical errors) relative to the previous platform release versions of these scripts.

The technical effects of the present disclosure include a versioned script management (VSM) system that enables a client instance to implement versioned script management. The disclosed design includes a versioned scripts table storing version information for each script. The version information tracks platform release information (e.g., family, patch, and/or hotfix release version information) of each script, while also tracking client-specific versions of these scripts that have been modified after release. As such, the disclosed VSM system enables improved tracking and management of script versions. For example, the disclosed VSM system can apply platform release updates to scripts of a client instance without the possibility of introducing regressions. This enables a client to immediately apply platform release updates without the concern that the behavior of scripts, and objects that load and utilize these scripts, will be undesirably modified as a result of the update. This also provides the cloud-based platform provider greater freedom with respect to the platform release schedule, as clients that do not wish to wait for a platform release update can proceed to modify a platform script with the confidence that the script will not be automatically replaced and regressions introduced when the platform release is later applied. Additionally, using the stored version information, the disclosed VSM system enables improved tracking of the historical changes to a script as part of platform release updates and client-specific modifications.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
at least one memory configured to store a versioned scripts table and instructions of a versioned script management (VSM) server, wherein the versioned scripts table is configured to store a name, a body, and version information for each of a plurality of scripts; and
at least one processor configured to execute the stored instructions to cause the VSM server to perform actions comprising:
receiving, from a client device, a request to create a second script that is a modified version of a first script, wherein the request includes the name of the first script and a modified script body for the second script;
creating, in the versioned scripts table, an entry for the second script that includes the name of the first script as the name of the second script, the modified script body as the body of the second script, and version information of the second script;
receiving, from a first object being executed by the at least one processor, a second request to use a particular script, wherein the second request includes a name of the particular script and does not include version information of the particular script;
identifying, in the versioned scripts table, the first script as the particular script based on the version information of the first script indicating that the first script is a platform release version of a portion of the plurality of scripts having the same name as the particular script; and
providing, to the first object, the body of the first script from the versioned scripts table in response to the second request, wherein at least a portion of the body of the first script is loaded and executed during execution of the first object.

2. The system of claim 1, wherein the version information of the plurality of scripts comprises one or more platform release values and a version value.

3. The system of claim 2, wherein the one or more platform release values comprise a family value, a patch value, a hotfix value, or a combination thereof.

4. The system of claim 1, wherein, before creating the entry for the second script, the at least one processor is configured to execute the stored instructions to cause the VSM server to perform actions comprising:
determining a version value for the version information of the second script by incrementing a version value of the version information of the first script.

5. The system of claim 1, wherein the at least one processor is configured to execute the stored instructions to cause the VSM server to perform actions comprising:
receiving, from a second object being executed by the at least one processor, a third request to use the second script, wherein the third request includes the name of the second script and the version information of the second script;
retrieving, from the versioned scripts table, the body of the second script based on the name of the second script and the version information of the second script; and
providing, to the second object, the body of the second script in response to the third request, wherein at least a portion of the body of the second script is loaded and executed during execution of the second object.

6. The system of claim 1, wherein the first object comprises an application, an event handler, a business rule, a script, a discovery sensor, a discovery probe, or a discovery pattern.

7. The system of claim 1, wherein, to identify the first script as the particular script, the at least one processor is configured to execute the stored instructions to cause the VSM server to perform actions comprising:
  determining that the first script is the platform release version based on the version information of the first script indicating that the first script has a lowest version value of the portion of the plurality of scripts having the same name as the particular script; retrieving, from the versioned scripts table, the body of the first script.

8. The system of claim 1, wherein the at least one processor is configured to execute the stored instructions to cause the VSM server to perform actions comprising:
  identifying, in the at least one memory, a set of objects that each include a call to load a script of the plurality of scripts, wherein the call in each of the set of objects includes a name of the script and does not include version information of the script;
  identifying, in the versioned scripts table, the first script and the second script as both having the same name as the script; and
  updating, in the at least one memory, the call in each of the set of objects to include the version information of either the first script or the version information of the second script.

9. The system of claim 8, wherein the at least one processor is configured to execute the stored instructions to cause the VSM server to perform actions comprising:
  prompting a developer to select to load either the first script or the second script for each of the set of objects; and
  updating, in the at least one memory, the call in each of the set of objects to include the version information of the first script or the version information of the second script based on the selections of the developer.

10. The system of claim 1, wherein the at least one processor is configured to execute the stored instructions to cause the VSM server to perform actions comprising:
  receiving a third request to update one of the plurality of scripts as part of a new platform release, wherein the third request includes the name of the first script, a second modified script body, and one or more platform release values associated with the new platform release; and
  creating, in the versioned scripts table, an entry for a third script that includes the name of the first script as the name of the third script, the second modified script body as the body of the third script, as well as the one or more platform release values associated with the new platform release and a lowest version value as the version information of the third script.

11. A computer-implemented method of operating a versioned script management (VSM) server of a client instance, comprising:
  receiving, from a client device, a request to create a second script of the client instance that is a modified version of a first script of the client instance, wherein the request includes a name of the first script and a modified script body for the second script;
  retrieving, from a versioned scripts table storing a plurality of scripts of the client instance, version information of the first script, wherein the version information of the first script includes a version value of the first script;
  determining version information of the second script based on the version information of the first script, wherein a version value of the version information of the second script is greater than the version value of the version information of the first script;
  creating, in the versioned scripts table, an entry for the second script that includes the name of the first script as a name of the second script, the modified script body as a body of the second script, and the version information of the second script;
  receiving, from a first object being executed at the client instance, a second request to use a particular script, wherein the second request includes a name of the particular script and does not include version information of the particular script;
  identifying, in the versioned scripts table, the first script as the particular script based on the version information of the first script indicating that the first script has a lowest version value of a portion of the plurality of scripts having the same name as the particular script; and
  providing, to the first object, the body of the first script from the versioned scripts table in response to the second request, wherein at least a portion of the body of the first script is loaded and executed during execution of the first object.

12. The method of claim 11, wherein the version information of the first script indicates a particular platform release and the version value of the first script, and the version information of the second script indicates the particular platform release and the version value of the second script.

13. The method of claim 11, comprising:
  identifying a set of objects associated with the client instance that each comprise instructions to load a script of the plurality of scripts, wherein the instructions include a name of the script and do not include version information of the script;
  identifying, in the versioned scripts table, the first script and the second script as both having the same name as the script;
  prompting a developer to select to load either the first script or the second script for each of the set of objects; and
  updating the instruction in each of the set of objects to include the version information of the first script or the version information of the second script based on the selections of the developer.

14. The method of claim 13, wherein prompting the developer comprises:
  generating and presenting a graphical user interface (GUI) to the developer that receives selections from the developer to load either the first script or the second script for each of the set of objects, wherein the second script is selected to be loaded by default.

15. The method of claim 11, comprising:
  receiving, from a second object being executed at the client instance, a third request to use a second script of the plurality of scripts, wherein the third request includes a name of the second script;
  identifying the second script as the second script in the versioned scripts table based, at least in part, on the name of the second script and the version information of the second script;
  retrieving, from the versioned scripts table, the body of the second script; and
  providing, to the object, the body of the second script in response to the third request, wherein at least a portion of the body of the second script is loaded and executed during execution of the second object.

16. The method of claim 15, wherein the third request does not include version information of the second particular script, wherein identifying the second script comprises:

identifying the second script as the second particular script in the versioned scripts table based, at least in part, on the version information of the second script indicating that the second script has a highest version value of a portion of the plurality of scripts having the same name as the second particular script.

17. The method of claim 11, comprising:
before receiving the request from the client device, receiving an initial request for the client instance to use versioned script management; and
determining that the first script of the client instance is a platform release version associated with a platform release, and in response, creating an entry for the first script in the versioned scripts table that includes the name of the first script, a body of the first script, and version information that includes one or more platform release values of the platform release and a lowest version value as the version value of the first script.

18. A non-transitory, computer-readable medium storing instructions executable by a processor of a versioned script management (VSM) server of a client instance, the instructions comprising instructions to:
receive, from a client device, a request to create a second script of the client instance that is a modified version of a first script of the client instance, wherein the request includes a name of the first script and a modified script body for the second script;
retrieve, from a versioned scripts table of the client instance, version information of the first script that indicates a particular platform release and a version value of the first script;
determine version information of the second script based on the version information of the first script, wherein the version information of the second script indicates the particular platform release and indicates a version value that is greater than the version value of the first script;
create, in the versioned scripts table, an entry for the second script that includes the name of the first script as the name of the second script, the modified script body as the body of the second script, and the version information of the second script;
receive, from a first object being executed at the client instance, a second request to use a particular script, wherein the second request includes a name of the particular script and does not include version information of the particular script;
identify, in the versioned scripts table, the first script as the particular script based on the version information of the first script indicating that the first script has a lowest version value of a portion of the plurality of scripts having the same name as the particular script; and
provide, to the first object, the body of the first script from the versioned scripts table in response to the second request, wherein at least a portion of the body of the first script is loaded and executed during execution of the first object.

19. The medium of claim 18, wherein the instructions comprise instructions to:
receive a third request to update one of the plurality of scripts as part of a new platform release, wherein the third request includes the name of the first script, a second modified script body, and one or more platform release values associated with the new platform release; and
create, in the versioned scripts table, an entry for a third script that includes the name of the first script as a name of the third script, the second modified script body as a body of the third script, as well as the one or more platform release values associated with the new platform release and a lowest version value as the version information of the third script.

20. The medium of claim 18, wherein the instructions comprise instructions to:
receive, from a second object being executed at the client instance, a third request to use a second particular script, wherein the third request includes a name of the second particular script and version information of the second particular script;
identify the second script as the second particular script in the versioned scripts table based on the name of the second script and the version information of the second script;
retrieve, from the versioned scripts table, the body of the second script; and
provide, to the second object, the body of the second script in response to the second request, wherein at least a portion of the body of the second script is loaded and executed during execution of the second object.

* * * * *

UNITED STATES PATENT AND TRADEMARK OFFICE
CERTIFICATE OF CORRECTION

PATENT NO. : 11,474,845 B2
APPLICATION NO. : 17/015844
DATED : October 18, 2022
INVENTOR(S) : Steven Wade Francis It is certified that error appears in the above-identified patent and that said Letters Patent is hereby corrected as shown below:

In the Claims

Column 21, Claim 7, Lines 7-8 - please delete "; retrieving, from the versioned scripts table, the body of the first script".

Signed and Sealed this
Twenty-first Day of February, 2023

*Katherine Kelly Vidal*

Katherine Kelly Vidal
*Director of the United States Patent and Trademark Office*